US012126277B2

(12) United States Patent
Tsuruma et al.

(10) Patent No.: US 12,126,277 B2
(45) Date of Patent: Oct. 22, 2024

(54) CONTROL DEVICE FOR POWER CONVERSION APPARATUS (71) Applicant: TMEIC Corporation, Chuo-ku (JP)

(72) Inventors: Yoshinori Tsuruma, Tokyo (JP); Kenta Yamabe, Tokyo (JP)

(73) Assignee: TMEIC CORPORATION, Chuo-ku (JP)

( * ) Notice: Subject to any disclaimer, the term of this patent is extended or adjusted under 35 U.S.C. 154(b) by 162 days.

(21) Appl. No.: 17/755,018

(22) PCT Filed: Oct. 5, 2020

(86) PCT No.: PCT/JP2020/037759
§ 371 (c)(1),
(2) Date: Apr. 19, 2022

(87) PCT Pub. No.: WO2022/074716
PCT Pub. Date: Apr. 14, 2022

(65) Prior Publication Data
US 2022/0385210 A1 Dec. 1, 2022

(51) Int. Cl.
*H02M 7/53* (2006.01)
*H02M 1/08* (2006.01)
(Continued)

(52) U.S. Cl.
CPC ............. *H02M 7/539* (2013.01); *H02M 1/08* (2013.01); *H02M 1/126* (2013.01); *H02M 1/0009* (2021.05)

(58) Field of Classification Search
CPC ........ H02M 7/539; H02M 1/08; H02M 1/126; H02M 1/0009
See application file for complete search history.

(56) References Cited

U.S. PATENT DOCUMENTS 11,817,774 B2\* 11/2023 Fukasawa ............... H02M 1/32
2006/0119327 A1\* 6/2006 King ..................... H02M 3/157
323/222
(Continued)

FOREIGN PATENT DOCUMENTS

JP 2020-68552 A 4/2020

OTHER PUBLICATIONS

International Search Report and Written Opinion mailed on Dec. 15, 2020 in PCT/JP2020/037759 filed on Oct. 5, 2020 (citing reference AO therein, total 10 pages).

*Primary Examiner* — Rafael O Leon De Domenech
(74) *Attorney, Agent, or Firm* — Oblon, McClelland, Maier & Neustadt, L.L.P.

(57) ABSTRACT

A control device for a power conversion apparatus that can prevent a rush current from flowing into a power converter. In a power conversion apparatus with a power converter connected with a DC power supply, a filter, and a switch connected with an AC power supply are connected in series in that order, a control device for the power conversion apparatus includes: a calculation unit configured to calculate, from a value of an AC current flowing between the power converter and the filter and impedance of the filter, an estimated value for AC power to be outputted by the power converter; and a control unit configured to control an action of the power converter in a state that the switch is open such that a difference between a target value for AC power and the estimated value falls within an allowable range set in advance.

4 Claims, 5 Drawing Sheets

(51) Int. Cl.
*H02M 1/12* (2006.01)
*H02M 7/539* (2006.01)
*H02M 1/00* (2006.01)

(56) References Cited

U.S. PATENT DOCUMENTS

2022/0158568 A1* 5/2022 Uda .................... H02M 1/0025
2023/0208319 A1* 6/2023 Tsuruma ............. H02M 1/0067
363/98

* cited by examiner

CONTROL DEVICE FOR POWER CONVERSION APPARATUS

FIELD

The present disclosure relates to a control device for a power conversion apparatus.

BACKGROUND

PTL 1 discloses a control device for a power conversion apparatus. With the control device, an AC voltage synchronizing with the voltage of a power system is outputted from the power conversion apparatus when the power conversion apparatus is started and, thereafter, the control mode of the power conversion apparatus is switched and hence, a rush current is prevented from flowing into the power conversion apparatus.

CITATION LIST

Patent Literature

[PTL 1] JP 2020-68552 A

SUMMARY

Technical Problem

However, the control device described in PTL 1 controls the power conversion apparatus by using the value of an output voltage from an inverter. Therefore, it is necessary to provide a voltage sensor for detecting an output voltage from the inverter.

The present disclosure has been made to solve the above-mentioned problem. It is an object of the present disclosure to provide a control device for a power conversion apparatus which can prevent a rush current from flowing into the power conversion apparatus with a simple configuration.

Solution to Problem

The present disclosure is directed to a control device for a power conversion apparatus, the power conversion apparatus having a power converter, a filter, and a switch connected between a DC power supply and an AC power supply in series in order from the DC power supply, the control device including: a calculation unit configured to calculate, from a value of an AC current flowing between the power converter and the filter and a value of impedance of the filter, an estimated value for AC power to be outputted by the power converter; and a control unit configured to control an action of the power converter in a state where the switch is open such that a difference between a target value for AC power and the estimated value falls within an allowable range set in advance, the target value being calculated based on a value of an AC current flowing between the filter and the switch and a value of an AC voltage applied between the switch and the AC power supply, the control unit being configured to close the switch when the difference between the target value and the estimated value falls within the allowable range set in advance.

Advantageous Effects of Invention

According to the present disclosure, the control device closes the switch when the difference between the target value for AC power to be outputted by the power converter and the estimated value falls within the allowable range set in advance. Therefore, it is possible to prevent a rush current from flowing into the power converter with a simple configuration.

DESCRIPTION OF EMBODIMENT

An embodiment will be described with reference to attached drawings. In the respective drawings, identical or corresponding components are given the same reference symbols. The repetitive descriptions of such components will be simplified or omitted when appropriate.

Embodiment 1

Figure 1:
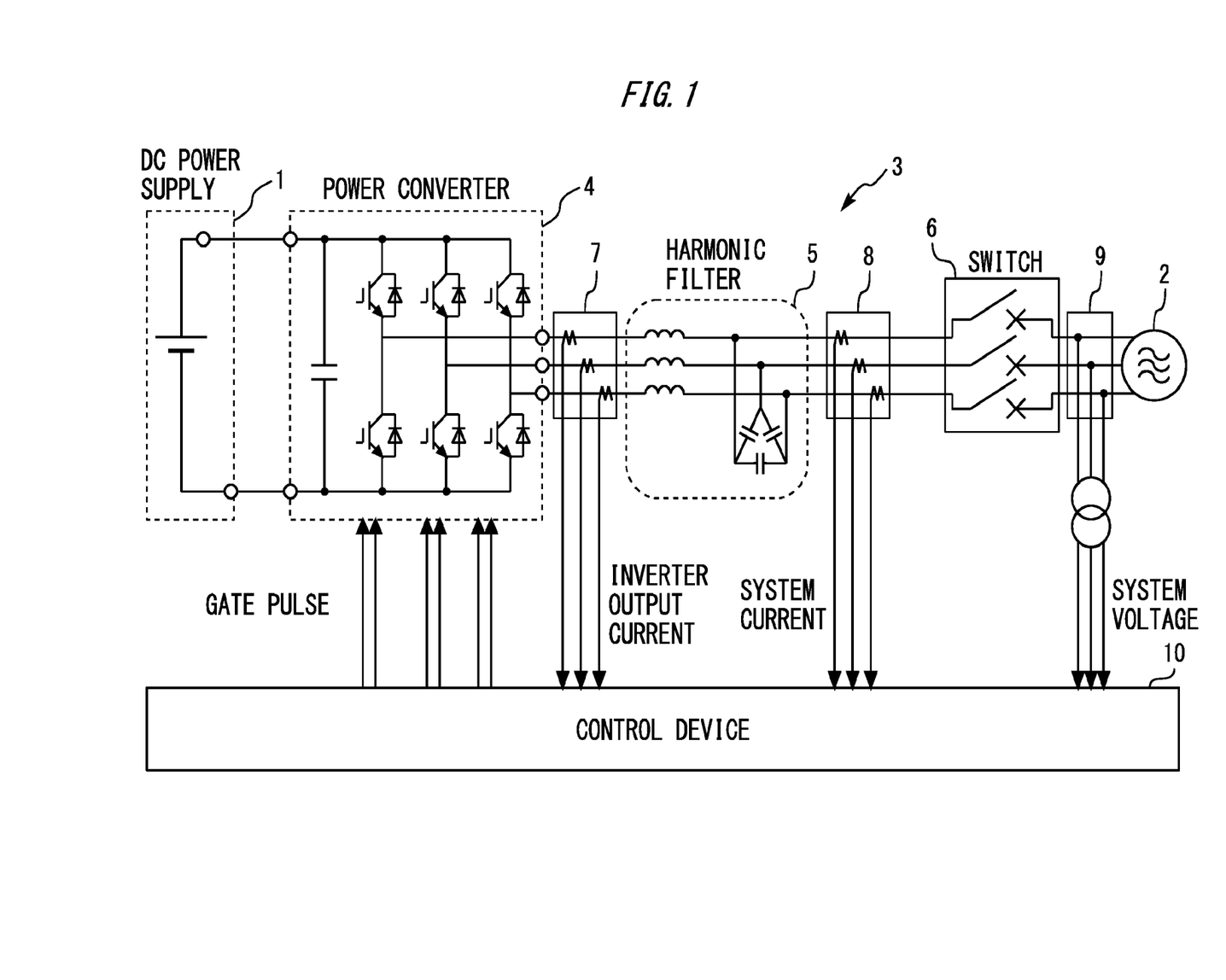
FIG. 1 is a configuration diagram of a power system to which a control device for a power conversion apparatus of an embodiment 1 is applied.

FIG. 1 is a configuration diagram of a power system to which a control device for a power conversion apparatus of an embodiment 1 is applied.

The power system shown in FIG. 1 includes a DC power supply 1, an AC power supply 2, and a power conversion apparatus 3. For example, the DC power supply 1 may be a solar cell. For example, the AC power supply 2 may be a power system operated by a power company or the like. The power conversion apparatus 3 is connected between the DC power supply 1 and the AC power supply 2.

The power conversion apparatus 3 includes a power converter 4, a harmonic filter 5, a switch 6, a first current detector 7, a second current detector 8, a voltage detector 9, and a control device 10. The power converter 4, the harmonic filter 5, and the switch 6 are connected in series in that order from the DC power supply 1.

The power converter 4 is provided for converting DC power from the DC power supply 1 to AC power. The harmonic filter 5 is provided for suppressing harmonics of a DC current outputted from the power converter 4. The switch 6 is provided for closing and opening wirings provided between the harmonic filter 5 and the AC power supply 2.

The first current detector 7 is provided for detecting the value of an AC current flowing between the power converter 4 and the harmonic filter 5 as the value of an inverter output current. The second current detector 8 is provided for detecting the value of an AC current flowing between the harmonic filter 5 and the switch 6 as the value of a system current. The voltage detector 9 is provided for detecting the value of an AC voltage applied between the switch 6 and the AC power supply 2 as the value of a system voltage.

The control device 10 is provided for controlling the power converter 4 based on a detected value from the first current detector 7, a detected value from the second current detector 8, and a detected value from the voltage detector 9.

Next, the control device 10 will be described with reference to FIG. 2.

Figure 2:
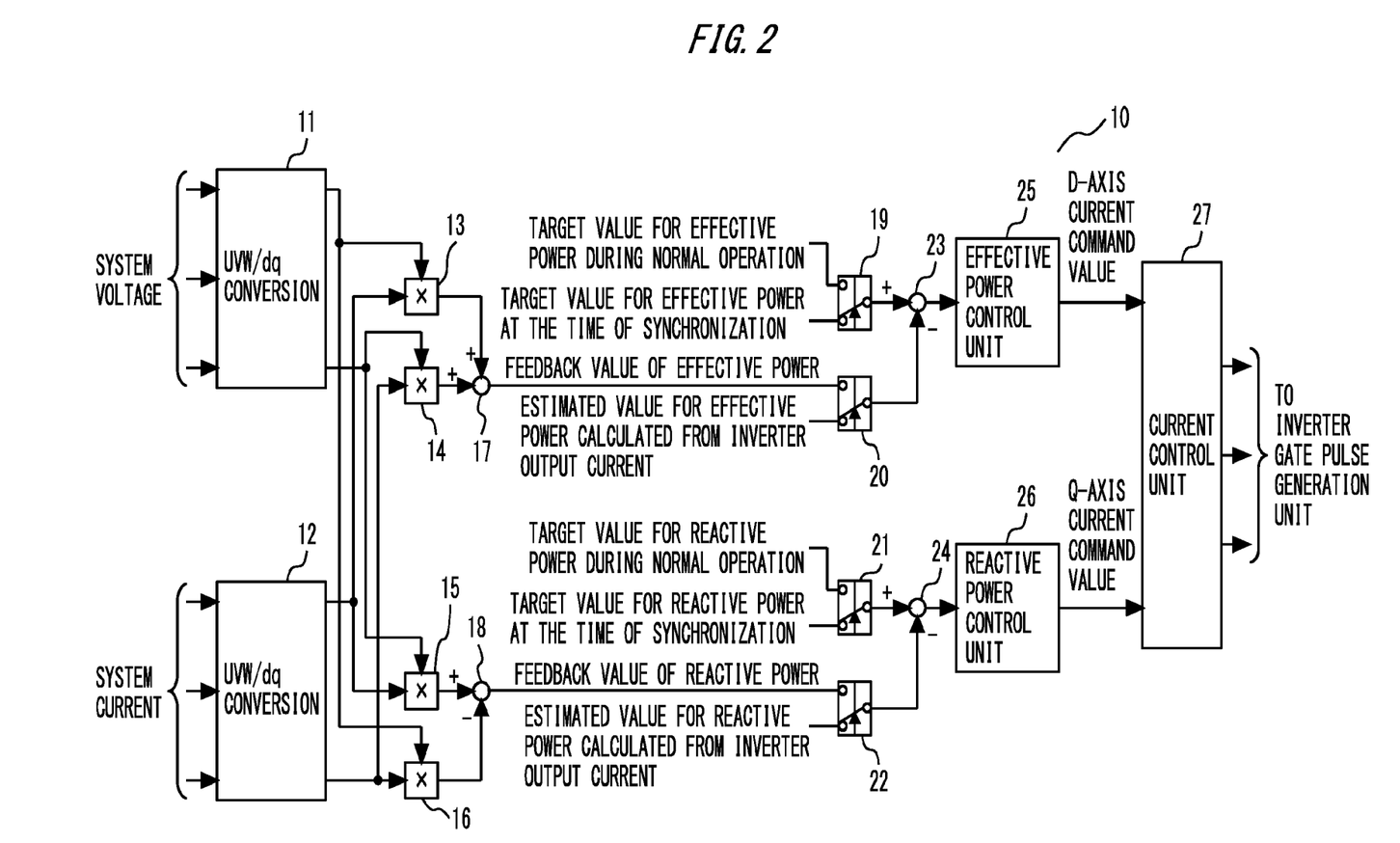
FIG. 2 is a block diagram of the control device for the power conversion apparatus of the embodiment 1.

FIG. 2 is a block diagram of the control device for the power conversion apparatus of the embodiment 1.

As shown in FIG. 2, the control device 10 includes a first conversion unit 11, a second conversion unit 12, a first multiplication unit 13, a second multiplication unit 14, a third multiplication unit 15, a fourth multiplication unit 16, an addition unit 17, a first subtraction unit 18, a first switching unit 19, a second switching unit 20, a third switching unit 21, a fourth switching unit 22, a second subtraction unit 23, a third subtraction unit 24, an effective power control unit 25, a reactive power control unit 26, and a current control unit 27.

The first conversion unit 11 receives an input of information on the value of a system voltage. The first conversion unit 11 converts the value of a three-phase AC voltage to the value of a d-axis voltage and the value of a q-axis voltage by dq conversion. The first conversion unit 11 outputs information on the value of the d-axis voltage and information on the value of the q-axis voltage.

The second conversion unit 12 receives an input of information on the value of a system current. The second conversion unit 12 converts the value of a three-phase AC current to the value of a d-axis current and the value of a q-axis current by dq conversion. The second conversion unit 12 outputs information on the value of the d-axis current and information on the value of the q-axis current.

The first multiplication unit 13 receives an input of the information on the value of the d-axis voltage from the first conversion unit 11. The first multiplication unit 13 receives an input of the information on the value of the d-axis current from the second conversion unit 12. The first multiplication unit 13 calculates a value obtained by multiplying the value of the d-axis voltage by the value of the d-axis current. The first multiplication unit 13 outputs information on the value obtained by multiplying the value of the d-axis voltage by the value of the d-axis current.

The second multiplication unit 14 receives an input of the information on the value of the q-axis voltage from the first conversion unit 11. The second multiplication unit 14 receives an input of the information on the value of the q-axis current from the second conversion unit 12. The second multiplication unit 14 calculates a value obtained by multiplying the value of the q-axis voltage by the value of the q-axis current. The second multiplication unit 14 outputs information on the value obtained by multiplying the value of the q-axis voltage by the value of the q-axis current.

The third multiplication unit 15 receives an input of the information on the value of the q-axis voltage from the first conversion unit 11. The third multiplication unit 15 receives an input of the information on the value of the d-axis current from the second conversion unit 12. The third multiplication unit 15 calculates a value obtained by multiplying the value of the q-axis voltage by the value of the d-axis current. The third multiplication unit 15 outputs information on the value obtained by multiplying the value of the q-axis voltage by the value of the d-axis current.

The fourth multiplication unit 16 receives an input of the information on the value of the d-axis voltage from the first conversion unit 11. The fourth multiplication unit 16 receives an input of the information on the value of the q-axis current from the second conversion unit 12. The fourth multiplication unit 16 calculates a value obtained by multiplying the value of the d-axis voltage by the value of the q-axis current. The fourth multiplication unit 16 outputs information on the value obtained by multiplying the value of the d-axis voltage by the value of the q-axis current.

The addition unit 17 receives an input of information on the output value from the first multiplication unit 13. The addition unit 17 receives an input of information on the output value from the second multiplication unit 14. The addition unit 17 calculates the feedback value of effective power by adding the output value from the second multiplication unit 14 to the output value from the first multiplication unit 13. The addition unit 17 outputs information on the feedback value of the effective power.

The first subtraction unit 18 receives an input of information on the output value from the third multiplication unit 15. The first subtraction unit 18 receives an input of the output value from the fourth multiplication unit 16. The first subtraction unit 18 calculates the feedback value of reactive power by subtracting the output value from the fourth multiplication unit 16 from the output value from the third multiplication unit 15. The first subtraction unit 18 outputs information on the feedback value of the reactive power.

The first switching unit 19 receives an input of information on the target value for effective power at the time of synchronization. The target value for effective power at the time of synchronization is a value based on the value of an inverter current and the value of a system voltage in the state where the switch 6 is open. The first switching unit 19 receives an input of information on the target value for effective power during normal operation. The target value for effective power during normal operation is a value based on the value of a system current and the value of a system voltage in the state where the switch 6 is closed. The first switching unit 19 switches an output value when a condition set in advance is established. For example, when the switch 6 is changed from a closed state to an open state, the first switching unit 19 switches information on an output value from information on the target value for effective power during normal operation to information on the target value for effective power at the time of synchronization. For example, when the switch 6 is changed from an open state to a closed state, the first switching unit 19 switches information on an output value from information on the target value for effective power at the time of synchronization to information on the target value for effective power during normal operation.

The second switching unit 20 receives an input of the feedback value of effective power. The second switching unit 20 receives an input of the estimated value for effective power. The estimated value for effective power is a value calculated, based on an inverter output current, as output power that is necessary for the value of the voltage outputted from the power converter 4 to match the value of the system voltage in the state where the switch 6 is open. The second switching unit 20 switches an output value when a condition set in advance is established. For example, when the switch 6 is changed from a closed state to an open state, the second switching unit 20 switches information on an output value from information on the feedback value of effective power to information on the estimated value for effective power. For example, when the switch 6 is changed from an open state to a closed state, the second switching unit 20 switches information on an output value from information on the estimated value for effective power to information on the feedback value of effective power.

The third switching unit 21 receives an input of information on the target value for reactive power at the time of synchronization. The target value for reactive power at the time of synchronization is a value based on the value of an inverter current and the value of a system voltage in the state where the switch 6 is open. The third switching unit 21 receives an input of information on the target value for reactive power during normal operation. The target value for reactive power during normal operation is a value based on the value of a system current and the value of a system voltage in the state where the switch 6 is closed. The third switching unit 21 switches an output value when a condition set in advance is established. For example, when the switch 6 is changed from a closed state to an open state, the third switching unit 21 switches information on an output value from information on the target value for reactive power during normal operation to information on the target value for reactive power at the time of synchronization. For example, when the switch 6 is changed from an open state to a closed state, the third switching unit 21 switches information on an output value from information on the target value for reactive power at the time of synchronization to information on the target value for reactive power during normal operation.

The fourth switching unit 22 receives an input of information on the feedback value of reactive power. The fourth switching unit 22 receives an input of information on the estimated value for reactive power. The estimated value for reactive power is a value calculated, based on an inverter output current, as output power that is necessary for the value of a voltage outputted from the power converter 4 to match the value of a system voltage in the state where the switch 6 is open. The fourth switching unit 22 switches an output value when a condition set in advance is established. For example, when the switch 6 is changed from a closed state to an open state, the fourth switching unit 22 switches information on an output value from information on the feedback value of reactive power to information on the estimated value for reactive power. For example, when the switch 6 is changed from an open state to a closed state, the fourth switching unit 22 switches information on an output value from information on the estimated value for reactive power to information on the feedback value of reactive power.

The second subtraction unit 23 receives an input of information on the output value from the first switching unit 19. The second subtraction unit 23 receives an input of information on the output value from the second switching unit 20. The second subtraction unit 23 calculates a value obtained by subtracting the output value from the second switching unit 20 from the output value from the first switching unit 19. The second subtraction unit 23 outputs information on the value obtained by subtracting the output value from the second switching unit 20 from the output value from the first switching unit 19.

The third subtraction unit 24 receives an input of information on the output value from the third switching unit 21. The third subtraction unit 24 receives an input of information on the output value from the fourth switching unit 22. The third subtraction unit 24 calculates a value obtained by subtracting the output value from the fourth switching unit 22 from the output value from the third switching unit 21. The third subtraction unit 24 outputs information on the value obtained by subtracting the output value from the fourth switching unit 22 from the output value from the third switching unit 21.

The effective power control unit 25 receives an input of information on the output value from the second subtraction unit 23. The effective power control unit 25 calculates a d-axis current command value based on the output value from the second subtraction unit 23. The effective power control unit 25 outputs information on the d-axis current command value.

The reactive power control unit 26 receives an input of information on the output value from the third subtraction unit 24. The reactive power control unit 26 calculates a q-axis current command value based on the output value from the third subtraction unit 24. The reactive power control unit 26 outputs information on the q-axis current command value.

The current control unit 27 receives an input of information on the d-axis current command value from the effective power control unit 25. The current control unit 27 receives an input of information on the q-axis current command value from the reactive power control unit 26. The current control unit 27 outputs information on the d-axis voltage command value and information on the q-axis voltage command value to an inverter gate pulse generation unit that controls the action of the power converter 4.

Next, a method for controlling the switch 6 by the control device 10 will be described with reference to FIG. 3.

Figure 3:
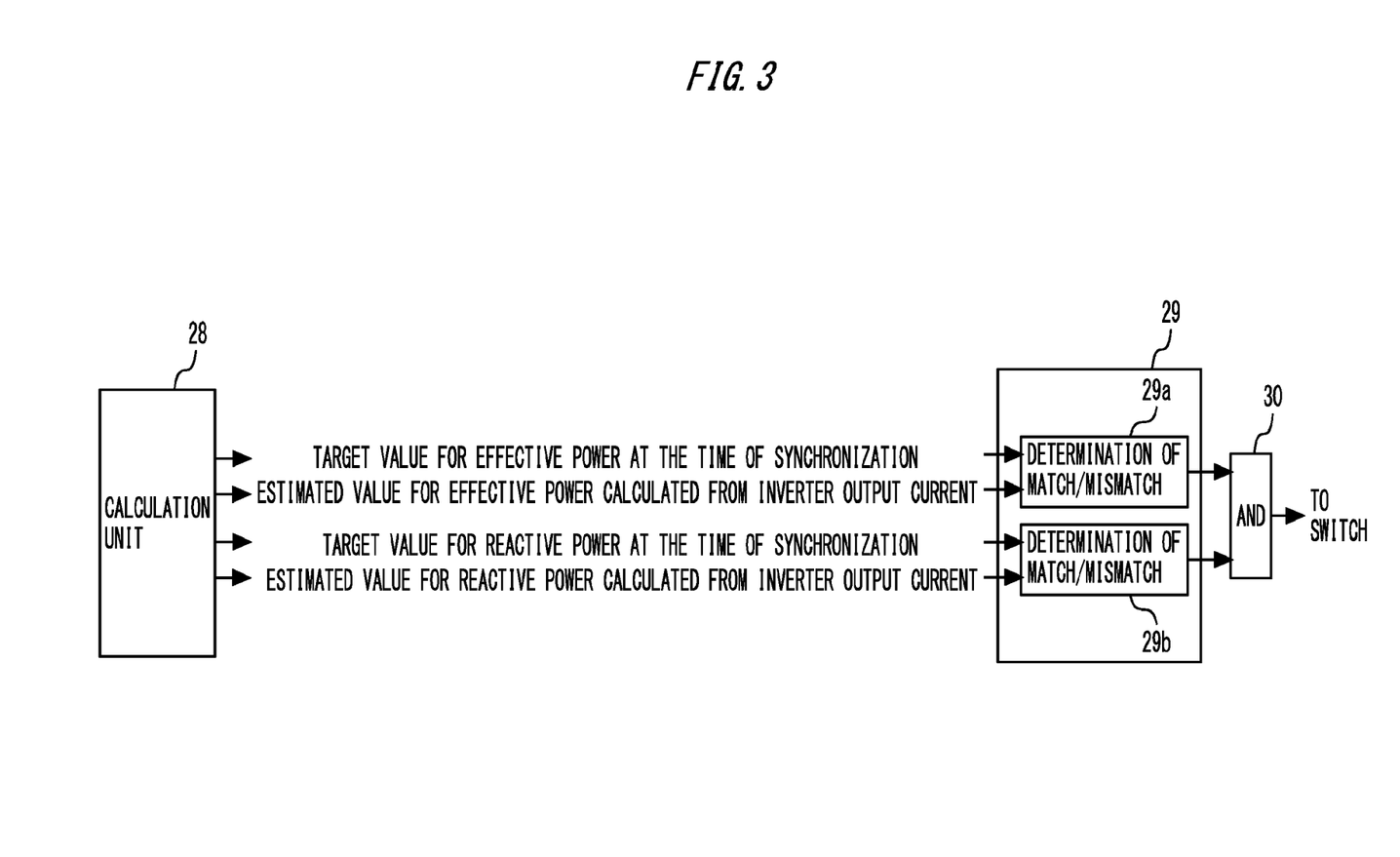
FIG. 3 is a block diagram of the main part of the control device for the power conversion apparatus of the embodiment 1.

FIG. 3 is a block diagram of the main part of the control device for the power conversion apparatus of the embodiment 1.

As shown in FIG. 3, the control device 10 includes a calculation unit 28, a comparison unit 29, and a control unit 30.

The calculation unit 28 calculates a target value for effective power at the time of synchronization. For example, the target value for effective power at the time of synchronization is a value equal to the value of effective power based on the value of an inverter current and the value of a system voltage in the state where the switch 6 is open. The calculation unit 28 outputs information on the target value for effective power at the time of synchronization to the first switching unit 19 not shown in FIG. 3.

The calculation unit 28 calculates, from the value of AC current outputted from the power converter 4 at the time of synchronization, the estimated value for effective power to be outputted from the power converter 4. Specifically, the calculation unit 28 calculates, from the value of an inverter output current and the value of impedance of the harmonic filter 5, the estimated value for an effective voltage to be outputted from the power converter 4. The calculation unit 28 calculates the estimated value for effective power from the value of the inverter output current and the estimated value for the effective voltage. The calculation unit 28 outputs information on the estimated value for effective power to the second switching unit 20 not shown in FIG. 3.

The calculation unit 28 calculates a target value of reactive power at the time of synchronization. For example, the target value for effective power at the time of synchronization is a value equal to the value of reactive power based on the value of an inverter current and the value of a system voltage in the state where the switch 6 is open. The calculation unit 28 outputs the target value for reactive power at the time of synchronization to the third switching unit 21 not shown in FIG. 3.

The calculation unit 28 calculates, from the value of an AC current outputted from the power converter 4 at the time of synchronization, the estimated value for reactive power to be outputted from the power converter 4. Specifically, the calculation unit 28 calculates, from the value of an inverter output current and the value of impedance of the harmonic filter 5, the estimated value for a reactive voltage to be outputted from the power converter 4. The calculation unit 28 calculates the estimated value for reactive power from the value of the inverter output current and the estimated value for the reactive voltage. The calculation unit 28 outputs information on the estimated value for reactive power to the fourth switching unit 22 not shown in FIG. 3.

The comparison unit 29 includes an effective power determination unit 29a and a reactive power determination unit 29b.

The effective power determination unit 29a receives an input of information on the target value for effective power at the time of synchronization from the calculation unit 28. The effective power determination unit 29a receives an input of information on the estimated value for effective power from the calculation unit 28. The effective power determination unit 29a performs a comparison between the target value for effective power at the time of synchronization and the estimated value. The effective power determination unit 29a determines whether a difference between the target value for effective power at the time of synchronization and the estimated value falls within an allowable range set in advance. For example, the effective power determination unit 29a determines whether the target value for effective power at the time of synchronization matches the estimated value. The effective power determination unit 29a outputs information on the determination result of whether the target value for effective power at the time of synchronization matches the estimated value.

The reactive power determination unit 29b receives an input of information on the target value for reactive power at the time of synchronization from the calculation unit 28. The reactive power determination unit 29b receives an input of information on the estimated value for reactive power from the calculation unit 28. The reactive power determination unit 29b performs a comparison between the target value for reactive power at the time of synchronization and the estimated value. The reactive power determination unit 29b determines whether a difference between the target value for reactive power at the time of synchronization and the estimated value falls within an allowable range set in advance. For example, the reactive power determination unit 29b determines whether the target value for reactive power at the time of synchronization matches the estimated value. The reactive power determination unit 29b outputs information on the determination result of whether the target value for reactive power at the time of synchronization matches the estimated value.

The control unit 30 receives an input of information on the determination result from the effective power determination unit 29a. The control unit 30 receives an input of information on the determination result from the reactive power determination unit 29b. The control unit 30 switches opening/closing of the switch 6 based on the determination result of the effective power determination unit 29a and the determination result of the reactive power determination unit 29b. For example, when a difference between the target value for effective power at the time of synchronization and the estimated value falls within the allowable range set in advance, and when a difference between the target value for reactive power at the time of synchronization and the estimated value falls within the allowable range set in advance, the control unit 30 closes the switch 6. For example, when the target value for effective power at the time of synchronization matches the estimated value, and when the target value for reactive power at the time of synchronization matches the estimated value, the control unit 30 closes the switch 6.

Next, the summary of the action of the control device 10 will be described with reference to FIG. 4.

Figure 4:
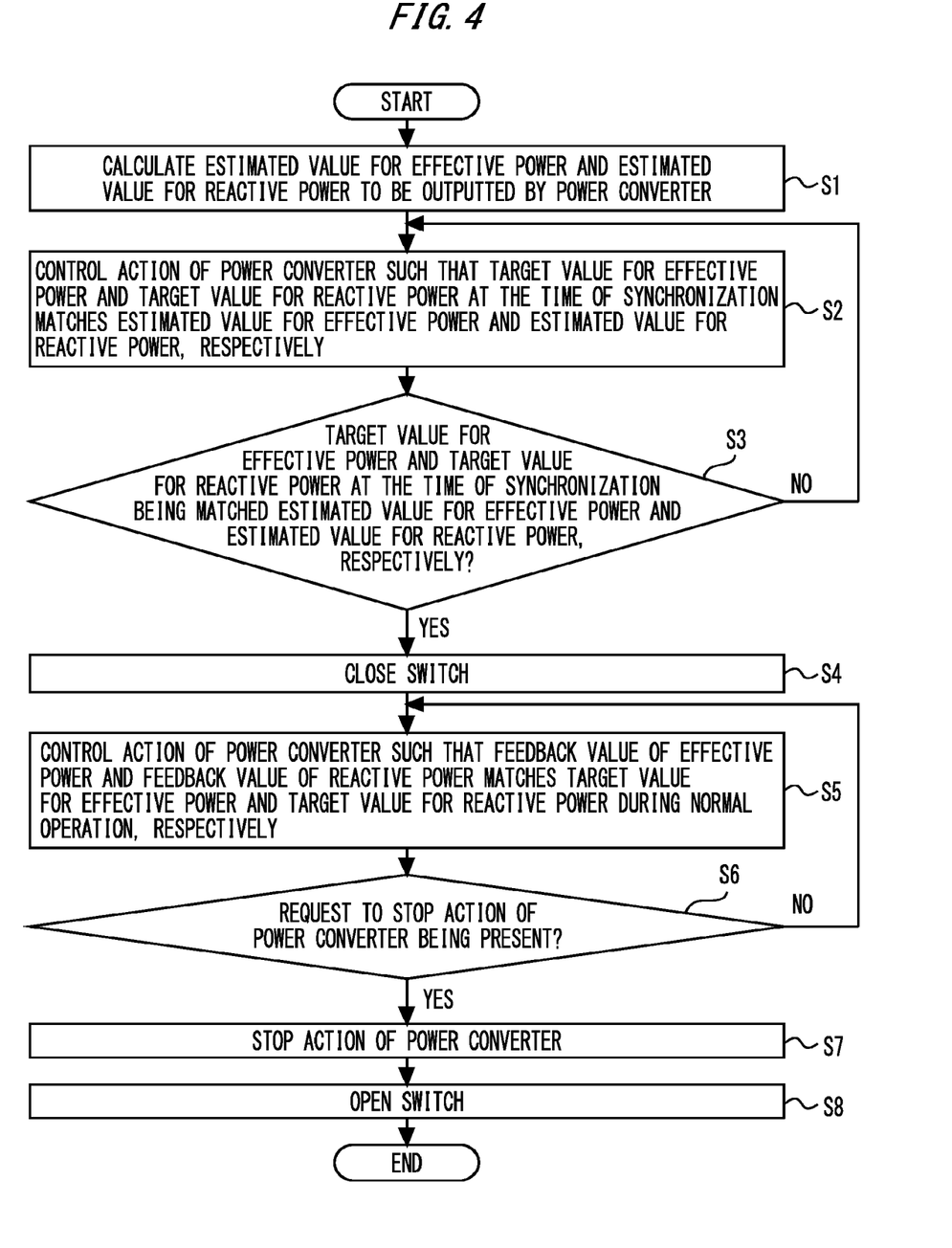
FIG. 4 is a flowchart for describing the summary of the action of the control device for the power conversion apparatus of the embodiment 1.

FIG. 4 is a flowchart for describing the summary of the action of the control device for the power conversion apparatus of the embodiment 1.

In step S1, the control device 10 calculates the estimated value for effective power and the estimated value for reactive power to be outputted by the power converter 4. Thereafter, the control device 10 performs the action of step S2. In step S2, the current control unit 27 controls the action of the power converter 4 such that the target value for effective power and the target value for reactive power at the time of synchronization match the estimated value for effective power and the estimated value for reactive power, respectively.

Thereafter, the control device 10 performs the action of step S3. In step S3, the control device 10 determines whether the target value for effective power and the target value for reactive power at the time of synchronization match the estimated value for effective power and the estimated value for reactive power, respectively.

When the target value for effective power at the time of synchronization does not match the estimated value for effective power, or when the target value for reactive power at the time of synchronization does not match the estimated value for reactive power in step S3, the control device 10 performs the action of step S2.

When the target value for effective power and the target value for reactive power at the time of synchronization match the estimated value for effective power and the estimated value for reactive power, respectively, in step S3, the control device 10 performs the action of step S4.

In step S4, the control device 10 closes the switch 6. Thereafter, the control device 10 performs the action of step S5. In step S5, the control device 10 controls the action of the power converter 4 such that the feedback value of effective power and the feedback value of reactive power match the target value for effective power and the target value for reactive power during normal operation, respectively.

Thereafter, the control device 10 performs the action of step S6. In step S6, the control device 10 determines whether a request to stop the action of the power converter 4 is present. When a request to stop the action of the power converter 4 is not present in step S6, the control device 10 performs the action of step S5. When the request to stop the action of the power converter 4 is present in step S6, the control device 10 performs the action of step S7.

In step S7, the control device 10 stops the action of the power converter 4. Thereafter, the control device 10 performs the action of step S8. In step S8, the control device 10 opens the switch 6. Thereafter, the control device 10 finishes the action.

According to the embodiment 1 described heretofore, the control device 10 closes the switch 6 when a difference between the target value for AC power and the estimated value falls within the allowable range set in advance. In this case, synchronization can be performed even if a detector for a voltage outputted from the power converter 4, a control means for a voltage outputted from the power converter 4, and wirings and the like used for the detector and the control means are not provided to perform synchronization at the time of connecting the power converter 4 to a system. As a result, when the power converter 4 is connected to the system, it is possible to cause the voltage outputted from the power converter 4 to match the AC voltage on the input side of the AC power supply 2 in amplitude, phase angle, and frequency. Therefore, it is possible to prevent a rush current from flowing into the power converter 4 with a simple configuration at a low cost.

Further, when a target value for AC power matches an estimated value, the control device 10 closes the switch 6. Therefore, it is possible to prevent a rush current from flowing into the power converter 4 with more certainty.

Further, the control device 10 includes the comparison unit 29. Therefore, it is possible to more accurately determine whether the target value for AC power matches the estimated value.

Further, when the switch 6 is closed, the control device 10 controls the action of the power converter 4 such that a difference between the feedback value of power and the target value of power during normal operation falls within an allowable range set in advance. Therefore, the power converter 4 can rapidly shift to a normal operation.

The DC power supply 1 may be a rectifier. The DC power supply 1 may be a battery. The DC power supply 1 may be a capacitor.

The first switching unit 19 may switch information on an output value when a command to open/close the switch 6 is outputted to the switch 6. In this case, information on the value to be outputted can be switched even if the control device 10 does not detect opening/closing of the switch 6.

The second switching unit 20 may switch information on an output value when a command to open/close the switch 6 is outputted to the switch 6. In this case, information on the value to be outputted can be switched even if the control device 10 does not detect opening/closing of the switch 6.

The third switching unit 21 may switch information on an output value when a command to open/close the switch 6 is outputted to the switch 6. In this case, information on the value to be outputted can be switched even if the control device 10 does not detect opening/closing of the switch 6.

The fourth switching unit 22 may switch information on an output value when a command to open/close the switch 6 is outputted to the switch 6. In this case, information on the output value can be switched even if the control device 10 does not detect opening/closing of the switch 6.

The power converter 4 is not limited to the configuration of the illustrated circuitry. For example, the power converter 4 may have a configuration of a circuitry where an inverter is a multilevel inverter. For example, the power converter 4 may have a configuration of a circuitry where inverters are connected in series in multiple stages. For example, the power converter 4 may have the configuration of a circuitry where inverters are connected in parallel. For example, an inverter forming the power converter 4 may be a single phase inverter.

The harmonic filter 5 is not limited to the configuration of the illustrated circuitry. It is sufficient for the harmonic filter 5 to have a configuration where an electric current flows in the state where the switch 6 is open and the value of impedance is known. For example, the harmonic filter 5 may be a transformer.

Next, an example of the control device 10 will be described with reference to FIG. 5.

Figure 5:
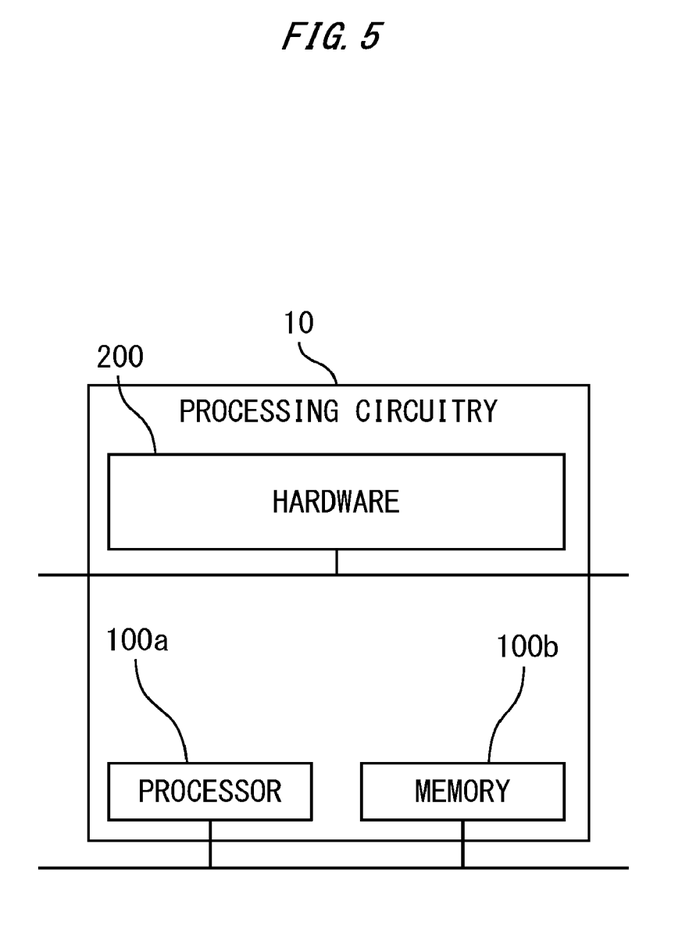
FIG. 5 is a hardware configuration diagram of the control device for the power conversion apparatus of the embodiment 1.

FIG. 5 is a hardware configuration diagram of the control device for the power conversion apparatus 3 of the embodiment 1.

The respective functions of the control device 10 may be achieved by the processing circuitry. For example, the processing circuitry includes at least one processor 100*a* and at least one memory 100*b*. For example, the processing circuitry includes at least one dedicated hardware 200.

In the case where the processing circuitry includes at least one processor 100*a* and at least one memory 100*b*, the respective functions of the control device 10 are achieved by software, firmware, or a combination of the software and the firmware. At least one of the software and the firmware is referred to as a program. At least one of the software and the firmware is stored in at least one memory 100*b*. At least one processor 100*a* reads and executes the program stored in at least one memory 100*b* to achieve the respective functions of the control device 10. At least one processor 100*a* is also referred to as a central processing unit, a processing unit, an arithmetic unit, a microprocessor, a microcomputer, or a DSP. For example, at least one memory 100*b* may be a nonvolatile or volatile semiconductor memory, such as a RAM, a ROM, a flash memory, an EPROM, or an EEPROM, or may be a magnetic disk, a flexible disk, an optical disc, a compact disc, a minidisc, a DVD, or the like.

In the case where the processing circuitry includes at least one dedicated hardware 200, the processing circuitry may be achieved by, for example, a single circuitry, a composite circuitry, a programmed processor, a parallel programmed processor, an ASIC, an FPGA, or a combination of the above. For example, the respective functions of the control device 10 may be respectively achieved by the processing circuitries. For example, the respective functions of the control device 10 may be collectively achieved by the processing circuitry.

Some of the respective functions of the control device 10 may be achieved by the dedicated hardware 200, and other functions may be achieved by the software or the firmware. For example, the function of the control unit 30 may be achieved by a processing circuitry formed of the dedicated hardware 200, and functions other than the function of the control unit 30 may be achieved by at least one processor 100*a* reading and executing the program stored in at least one memory 100*b*.

As described above, the processing circuitry achieves the respective functions of the control device 10 by the hardware 200, software, firmware, or a combination of the above.

INDUSTRIAL APPLICABILITY

As described above, the control device for the power conversion apparatus of the present disclosure can be used for a power system.

REFERENCE SIGNS LIST

1 DC power supply
2 AC power supply
3 power conversion apparatus
4 power converter
5 harmonic filter
6 switch
7 first current detector
8 second current detector
9 voltage detector
10 control device
11 first conversion unit
12 second conversion unit
13 first multiplication unit
14 second multiplication unit
15 third multiplication unit
16 fourth multiplication unit
17 addition unit
18 first subtraction unit 19 first switching unit
20 second switching unit
21 third switching unit
22 fourth switching unit
23 second subtraction unit
24 third subtraction unit
25 effective power control unit
26 reactive power control unit
27 current control unit
28 calculation unit
29 comparison unit
29a effective power determination unit
29b reactive power determination unit
30 control unit
100a processor
100b memory
200 hardware

The invention claimed is:

1. A control device for a power conversion apparatus, the power conversion apparatus having a power converter, a filter, and a switch connected between a DC power supply and an AC power supply in series in order from the DC power supply, the control device comprising:
   a calculation unit configured to calculate, from a value of an AC current flowing between the power converter and the filter and a value of impedance of the filter, an estimated value for AC power to be outputted by the power converter; and
   a control unit configured to control an action of the power converter in a state where the switch is open such that a difference between a target value for AC power and the estimated value falls within an allowable range set in advance, the target value being calculated based on a value of an AC current flowing between the filter and the switch and a value of an AC voltage applied between the switch and the AC power supply, the control unit being configured to close the switch when the difference between the target value and the estimated value falls within the allowable range set in advance.

2. The control device for a power conversion apparatus according to claim 1, wherein the control unit controls the action of the power converter such that the target value matches the estimated value, and the control unit closes the switch when the target value matches the estimated value.

3. The control device for a power conversion apparatus according to claim 1, comprising a comparison unit configured to perform a comparison for the difference between the target value and the estimated value, wherein
   the control unit closes the switch when the difference between the target value and the estimated value falls within the allowable range set in advance in the comparison performed by the comparison unit.

4. The control device for a power conversion apparatus according to claim 1, wherein when the switch is closed, the control unit controls the action of the power converter such that a difference between a feedback value of AC power and the target value for the AC power falls within an allowable range set in advance, the feedback value being calculated based on the value of the AC current flowing between the filter and the switch and the value of the AC voltage applied between the switch and the AC power supply.

* * * * *